United States Patent [19]
Fritz

[11] Patent Number: 5,979,012
[45] Date of Patent: Nov. 9, 1999

[54] MOBILE APPARATUS FOR DISPENSING AND RECOVERING WATER AND REMOVING WASTE THEREFROM

[75] Inventor: Gary Fritz, Santa Rosa, Calif.

[73] Assignee: Parker West International, L.L.C., Santa Rosa, Calif.

[21] Appl. No.: 08/991,452

[22] Filed: Dec. 16, 1997

Related U.S. Application Data

[60] Provisional application No. 60/033,010, Dec. 16, 1996.

[51] Int. Cl.$^6$ .................................. A47L 9/10; A47L 9/18
[52] U.S. Cl. ............................ 15/321; 210/205; 210/727; 210/730; 210/693
[58] Field of Search ............................. 15/320, 321, 322; 34/79, 80; 210/167, 205, 241, 667, 693, 727, 729, 730, 734, 735

[56] References Cited

U.S. PATENT DOCUMENTS

| | | | |
|---|---|---|---|
| 3,262,146 | 7/1966 | Hays .......................................... | 15/321 |
| 3,753,777 | 8/1973 | Thompsen et al. ....................... | 15/320 |
| 4,194,263 | 3/1980 | Herpers et al. ........................... | 15/320 |
| 4,443,909 | 4/1984 | Cameron ................................... | 15/320 |
| 4,475,264 | 10/1984 | Schulz . | |
| 4,845,801 | 7/1989 | Milly et al. . | |
| 5,016,314 | 5/1991 | Green et al. . | |
| 5,134,748 | 8/1992 | Lynn . | |
| 5,224,236 | 7/1993 | Sallquist . | |
| 5,287,589 | 2/1994 | Hughes . | |
| 5,331,713 | 7/1994 | Tipton . | |
| 5,404,613 | 4/1995 | Whyte . | |
| 5,469,597 | 11/1995 | Page . | |
| 5,469,598 | 11/1995 | Sales ......................................... | 15/321 |
| 5,520,803 | 5/1996 | Russell et al. ........................... | 210/241 |

FOREIGN PATENT DOCUMENTS 3740-705  6/1989  Germany .

OTHER PUBLICATIONS

Colloid Environmental Technologies Company Cleans Wastewater . . . Economically (brochure) 1993.
Steam Way International Inc. Powermatic Legacy 2100 (brochure) Feb. 1995.
Colloid Environmental Technologies Company Clarion (brochure) 1995.

*Primary Examiner*—Terrence R. Till
*Attorney, Agent, or Firm*—Douglas E. White

[57] ABSTRACT

A mobile surface contaminant extracting and water recycling apparatus comprises a standard truck, pickup, trailer or other wheeled container that is modified by the addition of a clay-based flocculent powder wastewater treatment unit. Mounted in combination with the wheeled container and the wastewater treatment unit is a vacuum steam cleaning unit. Steam is sent from the cleaning unit and sprayed by pressure guns onto the contaminated surface of a parking lot or other surface to be cleaned. The surface contaminants become emulsified in water condensed from the steam, which contaminated water then is vacuumed up by cleaning wands and returned by hose to the steam cleaning unit on the truck bed. From the steam unit, the contaminated water is piped to the adjacent truck-mounted wastewater treatment unit. The water is churned in the latter unit in the presence clay-based powder. The resultant floc sludge is deposited on top of porous cloth on a draining tray or trays. The water is allowed to drain from the sludge and that water is returned to the steam unit for recycling and reuse, or it may be discharged safely into sewer drains.

19 Claims, 1 Drawing Sheet

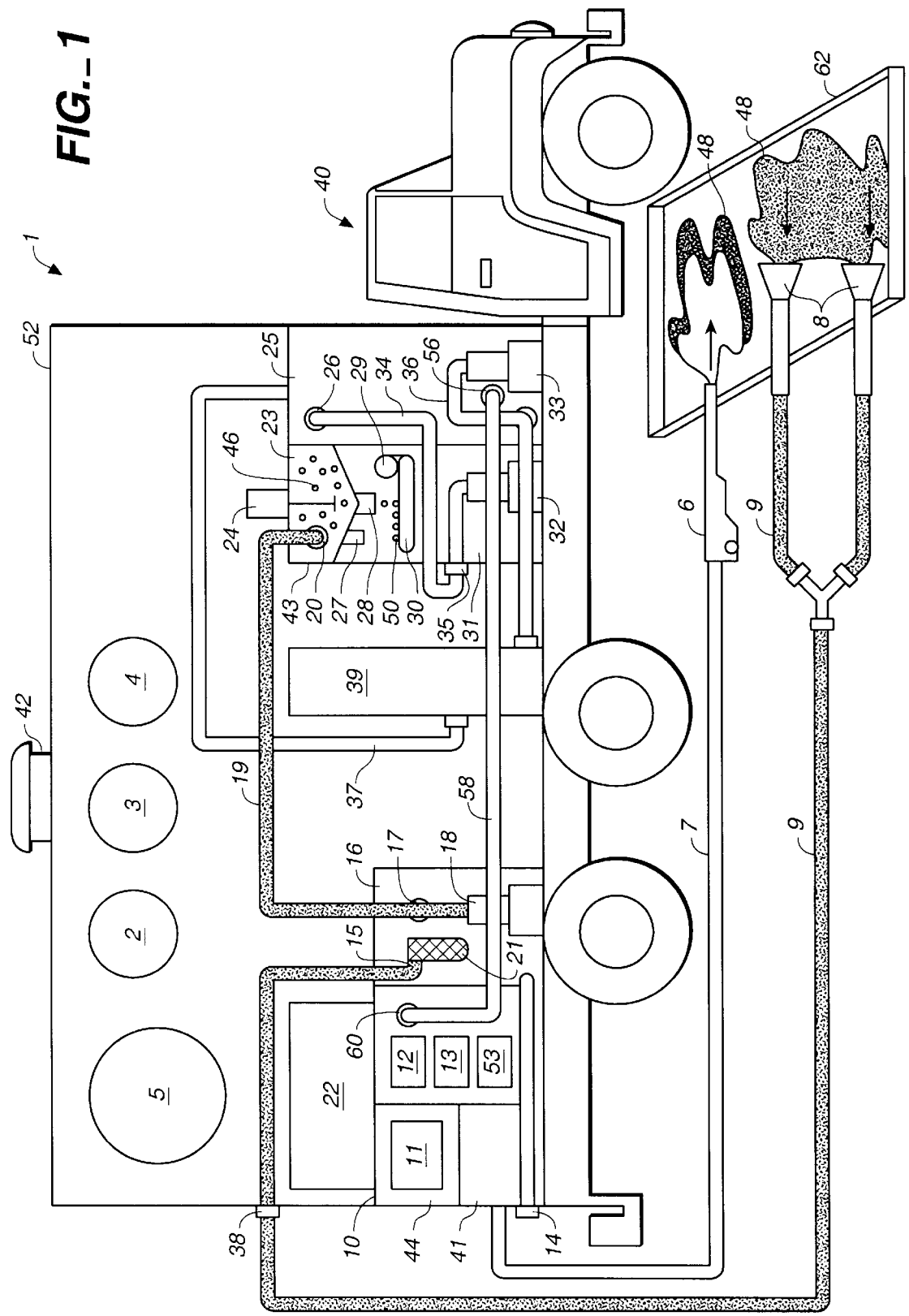

MOBILE APPARATUS FOR DISPENSING AND RECOVERING WATER AND REMOVING WASTE THEREFROM

CROSS REFERENCE TO RELATED APPLICATIONS

This application claims the benefit of U.S. provisional application No. 60/033,010, filed Dec. 16, 1996.

FEDERALLY SPONSORED RESEARCH OR DEVELOPMENT

Not applicable.

FIELD OF THE INVENTION

This invention relates to cleaning equipment, more particularly to a mobile apparatus having a closed-loop water system for removing waste from a variety of surfaces, which apparatus uses a clay-based powder as a flocculent to remove the waste from the treatment water.

BACKGROUND OF THE INVENTION

The maintenance of a clean and healthy water supply is a primary goal of society While the need to eliminate human waste products from the drinking supply has been addressed for centuries, the spread of technology in the industrial age has created relatively recently new sources of unhealthy chemical and biochemical contaminants, many of which are harmful or toxic to human and animal life at very low concentrations. Federal, State and local governments have long attempted to improve the fresh water supply, and to this end, have passed a series of increasingly strict laws and regulations concerning the discharge of contaminated water into storm sewers and other point and non-point sources of water pollution.

Yet, it remains necessary to clean oil, greases, suspended solids, heavy metals, diesel fuel, emulsions, latex paints, and similar hydrocarbon and metallic contaminants from environmental surfaces and other objects such as pavement, carpet, engines, vehicles, buildings, industrial equipment, boat bilges, and the like. These surfaces or objects often are situated remote from water treatment facilities. In the past, such cleaning has been done with high pressure steam hoses acting in cooperation with vacuum water-recovery apparatus. Of a number of such vacuum steam cleaning units commercially available, one example is the POWERMATIC brand steam cleaning unit, Legacy 2100 model, of Steam Way International, Inc., of Denver, Col.

Until recently, there has been no strict government regulation or monitoring of mobile steam cleaners. They have been discharging their contaminated wash water directly into storm drains, which usually lead straight into streams, rivers and, eventually, the ocean-causing significant pollution.

Alternatively, some of such industrial wastewater has been collected, stored and later transported to remote facilities for treatment, but this is an expensive and time-consuming process.

Governmental mandates are beginning to be implemented that require changes to current wastewater disposal practices used by the operators of such steam cleaners. Current methods that allow for storm drain runoff contamination increasingly will be banned. Steam cleaning companies will need to collect and clean their wash water and obtain a permit to discharge treated water to the sewer, or they will need to have a closed-loop system that will recycle their water. The only other alternative will be to have the wash water hauled away by a licensed hauler as hazardous waste-water. As noted, this is very expensive and carries a "cradle to grave" responsibility.

With respect to wastewater treatment systems that are immobile (i.e., they are installed as building fixtures and the like), it is known to use a clay-based powder (such as Montmorillonite clay and a cationic polymer) as a flocculent to remove emulsified oil and metals from water. The acids in the powder break the oil emulsion. The oil and other contaminants are fixated within the clay-based powder through a process of flocculation and encapsulation. capsulation. The floc settles to the bottom, or floats to the top, of the water treatment tank, whereupon it and the water may be separated.

This water then either is recycled or is discharged legally into a municipal sewer treatment system. The entrapped contaminants form a sludge which may be suitable for disposable in a Class II non-hazardous industrial landfill. Stationary apparatus utilizing this process is available from Colloid Environmental Technologies Co. (CETCO) of Arlington Heights, Ill. These units use CETCO's Model RM-10 clay-based treatment powder. A clay-based flocculent powder having similar characteristics and function is available under the brand name WYO-BEN from Wyo-Ben, Inc., of Billings, Mon. The standard input to such a system is contaminated water which temporarily has been collected within holding tanks.

Prior developments in this field may be generally illustrated by reference to the following information disclosure:

U.S. PATENT DOCUMENTS

| U.S. Pat. No. | Patentee | Issue Date |
| --- | --- | --- |
| 5,469,597 | T. Page | Nov. 28, 1995 |
| 5,134,748 | W. Lynn | Aug. 4, 1992 |
| 5,016,314 | D. Green et al. | May 21, 1991 |
| 5,287,589 | J. Hughes | Feb. 22, 1994 |
| 5,331,713 | S. Tipton | Jul. 26, 1994 |
| 5,224,236 | R. Sallquist | Jul. 6, 1993 |
| 5,404,613 | G. Whyte | Apr. 11, 1995 |
| 4,845,801 | G. Milly et al. | Jul. 11, 1989 |
| 4,475,264 | R. Schulz | Oct. 9, 1984 |

FOREIGN PATENT DOCUMENTS

| Document No. | Country | Date |
| --- | --- | --- |
| DE 3740-705 | Germany | Jun. 15, 1989 |

OTHER DOCUMENTS

| Title | Author | Date |
| --- | --- | --- |
| Cleans Wastewater . . . Economically | Colloid Environmental Technologies Company (CETCO) | 1993 |
| Powermatic Legacy 2100 | Steam Way International Inc. | Feb. 1995 |
| Clarion | CETCO | 1995 |

U.S. Pat. No. 5,469,597 teaches a mobile unit that uses high pressure fluid to clean a surface, vacuum the dirty water and filter it for reuse. A settling tank is included, along with bag filters.

U.S. Pat. No. 5,224,236 teaches a mobile steam unit that filters water, but does not appear to recycle it. Pat. No. 5,134,748 teaches a wheeled filtration system with a sponge cleaning element.

U.S. Pat. No. 5,287,589 teaches a mobile self-contained unit which uses "superheated" pressurized water (i.e., water raised to a greater temperature than standard steam cleaners). The contaminated fluid is subjected to moisture and particle separation and filtration with a demister filter and other filters. The cleaning fluid then is recycled.

The rest of the patents are representative of what was found in searches of the art.

SUMMARY OF THE INVENTION

The present invention is a mobile surface contaminant extracting and water recycling apparatus. A truck, pickup or trailer is modified by the addition of a clay-based flocculent powder wastewater treatment unit, preferably the CETCO Model TT 125BF wastewater treatment unit using the Model RM-10 powder described above. In novel combination with the truck and the wastewater treatment unit is a vacuum steam cleaning unit, such as the POWERMATIC brand steam cleaning unit, Legacy 2100 model, of Steam Way International, Inc., above.

One or more hand-operated vacuum collection units ("wands") of the steam cleaning unit are pushed across a parking lot or other horizontal surface to be cleaned. The device also may be employed to steam clean vehicle engines after being transported to the site of the vehicle. It may be necessary first to drive the vehicle onto an easily transported optional fiberglass catchment tray in order to prevent runoff into drains. The portable device also is useful for cleaning carpets and similar on-site work surfaces.

Steam first is sent from the cleaning unit and sprayed onto the contaminated surface by the dual-function hand vacuum unit or by separate hand units (one or more "pressure guns"). There are numerous examples of both types of unit in the art. The surface contaminants become emulsified in water condensed from the steam and degreasers, which contaminated water then is vacuumed up by the vacuum wands and returned by hose to the steam cleaning unit in the standard container "box" or shell on the truck bed. From the steam unit, the contaminated water is piped to the adjacent truck-mounted clay-based flocculent powder wastewater treatment unit. The water is churned or sheared in the latter unit in the presence of CETCO Model RM-10 or other clay-based flocculent powder. The resultant floc sludge is deposited on top of porous cloth on a draining tray or trays. The water is allowed to drain from the sludge and that water is returned to the steam unit for recycling and reuse, or it may safely be discharged to the sewer drain.

The cloth then is pulled up, sludge and all, and is tied into a bag for disposal. Insofar as the encapsulated contaminants will not leach from the sludge, the compact bag normally may be disposed of in drums or bulk containers to a Class II non-hazardous industrial landfill, at a great reduction in disposal cost. The elimination of the need to transport contaminated water off-site for treatment represents additional savings in time and cost.

The clay-based powder wastewater treatment unit may be modified by the substitution of fiberglass for metal where possible in housings, tanks and other parts. This both cuts down on the travel weight of the mobile system and extends the life of those parts which otherwise have a tendency to corrode.

Optionally, in the mobile surface contaminant extracting and water recycling apparatus there can be further combined additional treatment or filtration apparatus to remove contaminants that may be present in unacceptable trace amounts even after the clay-based flocculent primary treatment described above. For example, CETCO's CLARION brand column filtration unit, or its equivalent, may be installed on the truck between the discharge outlet of the Model RM-10 clay-based flocculent powder treatment unit and the holding tank thereof. However, it is anticipated that such further treatment may be required only in special cases, and probably could be left out of the combination (or selectively disengaged) for many, if not most, applications.

Even in cases where the apparatus is not set up to provide self-contained closed-loop water recycling, the ability to separate solid and liquid waste on-site greatly facilitates efficient and environmentally friendly disposal.

FEATURES AND ADVANTAGES

An object of this invention is to provide a mobile wastewater treatment system which uses clay-based flocculent treatment powder.

Another object is to disclose such an apparatus in combination with a steam cleaning unit.

Yet another object is to disclose the further combination of a column filtration unit.

Still another object is to provide such apparatus wherein the water used therein may be used in a closed-loop fashion, with little or no need for on-site water discharge.

Another feature is an apparatus that is easy to use, neat in appearance and suitable for mass production at relatively low cost.

Accordingly, a feature of this invention is a mobile apparatus for dispensing and recovering water and removing industrial waste therefrom, including a wheeled container and a clay-based flocculent powder wastewater treatment unit mounted in the wheeled container.

Another feature is a steam cleaning unit in fluid communication with the clay-based flocculent powder wastewater treatment unit.

Other features include a pressure gun attached by a solution hose to the steam cleaning unit and a vacuum wand attached by a vacuum hose to the steam cleaning unit. The wand and the gun may be located in a single rollered housing.

Still other features include: a recovery tank of the steam cleaning unit in fluid communication with the vacuum hose; a reaction tank of the clay-based flocculent powder wastewater treatment unit; a first transfer hose connecting the recovery tank of the steam cleaning unit to the reaction tank of the clay-based flocculent powder wastewater treatment unit; a first holding tank of the clay-based flocculent powder wastewater treatment unit located below the reaction tank thereof; a second holding tank of the clay-based flocculent powder wastewater treatment unit having a fluid capacity greater than the fluid capacity of the first holding tank; and a second transfer hose connecting the first holding tank to the second holding tank.

Yet another feature is a recycle hose connecting the second holding tank to the steam cleaning unit, the recycle hose in fluid communication with the solution hose, whereby a closed loop is formed between the vacuum hose and the solution hose.

Another feature is an optional column filtration unit in fluid communication with the second holding tank.

A feature of the preferred embodiment is that the wheeled container is the box or shell of a truck. Preferably, there may be more than one pressure gun and there may be more than one vacuum wand.

Yet another optional feature is a fiberglass tray onto which a work piece may be placed, with which to catch and collect water sprayed onto the work piece by the pressure gun for recovery by the vacuum wand.

Other novel features which are characteristic of the invention, as to organization and method of operation, together with further objects and advantages thereof will be better understood from the following description considered in connection with the accompanying drawing, in which a preferred embodiment of the invention is illustrated by way of example. It is to be expressly understood, however, that the drawing is for illustration and description only and is not intended as a definition of the limits of the invention.

Certain terminology and derivations thereof may be used in the following description for convenience in reference only, and will not be limiting. For example, words such as "upwardly," "downwardly," "leftward," and "rightward" would refer to directions in the drawings to which reference is made unless otherwise stated. Similarly, words such as "inwardly" and "outwardly" would refer to directions toward and away from, respectively, the geometric center of a device or area and designated parts thereof. References in the singular tense include the plural, and vice versa, unless otherwise noted.

BRIEF DESCRIPTION OF THE DRAWING

FIG. 1 is a partly schematic broken side elevation of a preferred embodiment of this invention.

DRAWING REFERENCE NUMERALS 1 mobile apparatus
2 solution hose reel
3 hose reel
4 hose reel
5 vacuum hose reel
6 pressure gun
7 solution hose
8 vacuum wand
9 vacuum hose
10 steam cleaning unit
11 motor
12 pressure pump
13 pressure regulator
14 purge valve
15 inlet of recovery tank
16 recovery tank
17 float valve
18 sump pump
19 transfer hose
20 inlet
21 bag filter
22 generator
23 reaction tank
24 mixer motor
25 300 gallon holding tank
26 inlet
27 clear water valve
28 sludge valve
29 filter cloth
30 band filter
31 50 gallon holding tank
32 sump pump
33 sump pump
34 transfer hose
35 outlet of the 50 gallon holding tank
36 transfer hose
37 recycle transfer hose
38 wastewater vacuum inlet
39 column filtration unit
40 truck
41 heater of steam cleaning unit
42 sky light and exhaust vent
43 wastewater treatment unit
44 solution tank
46 clay-based flocculent
48 work surface
50 sludge
52 container
53 engine oil cooler compartment
56 recycle outlet
58 recycle hose
60 cluster inlet
62 catchment tray

DETAILED DESCRIPTION OF THE INVENTION

Referring to FIG. 1, there is schematically illustrated therein a mobile apparatus 1 providing a simple on-site, closed-loop, one-step batch treatment system for cleaning industrial wastewater. Mobile apparatus 1 utilizes a clay-based flocculent powder 46 (in practice, hidden from view) to remove oil, greases, suspended solids, heavy metals, diesel fuel, emulsions and latex paints generated from the steam cleaning of work surfaces 48 on objects such as pavement, engines, buildings, equipment, carpet, vehicles, boat bilges, and the like.

On site, the closed-loop mobile apparatus 1 collects and, within minutes, cleans the dirty wash water generated from steam cleaning—enabling the operator to recycle and reuse the cleaned water or to discharge it directly to a sewer. Also, it normally renders a sludge 50 that is acceptable for Class II non-hazardous disposal.

This one-step, batch treatment system or apparatus 1 reclaims and filters the water via gravity flow through a polyester filter cloth media 29, utilizing a chemical clay-based flocculent 46 available from CETCO or Wyo-Ben, Inc., or other company that produces such clay-based chemical flocculent powder.

This invention preferably is contained in a 14 to 16 foot enclosed box container 52 on a 2 to 5 ton truck 40 or housed in an adequately enclosed portable trailer or other wheeled container 52 that can be left temporarily on the project site until the cleaning project is completed. This container provides a safe, enclosed, mobile and dry work station. Within the container 52 are suitably arranged loose hose storage reels, such as solution hose reel 2, general purpose hose reel 3, general purpose hose reel 4, and vacuum hose reel 5. The truck container preferably is ventilated by a common sky light and exhaust vent 42.

Importantly, together with the various pipes, hoses and holding tanks fitted therein, the container 52 provides double-walled containment as protection against accidental spills of contaminated water.

Integral parts of this invention include an internal or external water supply, re-covery tanks, and a steam pressure washing unit 10, preferably a Legacy 2100 (above), which unit includes a vacuum recovery system having dual vacuum wands 8. The steam cleaning unit 10 further includes a generator 22 driven by a gas or diesel-powered motor 11. The generator 22 and motor 11 are used for powering pumps, fans, mixer motor and the like.

Hot water is generated on board the truck 40 via a kerosene heating unit 41 housed within the unit 10. The heated water is used for cleaning and is delivered via one or more pressure guns or wands 6 that are supplied through a solution hose 7. The pressure gun or guns 6 and vacuum wands 8 together comprise one preferred means in fluid communication with the steam cleaning unit 10 for dispensing water and for recovering wastewater.

The solution hose 7 leads from the pressure regulator 13, which regulator is fed water from a engine oil cooler compartment 53. Detergent, degreaser, coalescent or the like from a solution tank 44 can be added to the water entering the heater to enhance the cleaning action. A heavy duty pressure pump 12 feeds the solution hose 7. Pressure regulation is accomplished by a pressure regulator 13.

The wash water is contained until vacuumed by damming storm drain openings, by providing suitable perimeter berms or by utilizing one or more mobile catchment trays 62 to prevent storm drain runoff contamination. For example, to clean an automobile engine on-site without causing contaminated water run-off, the car can be driven onto a raised-wall fiberglass catchment tray 62 that will temporarily hold water dripping down from the engine. Of course, for directly cleaning paved work surfaces, such trays will be dispensed with.

The vacuum wands 8 retrieve the wash water and bring it back via vacuum hoses 9 and into the recovery tank 16 though a water inlet 38 (for clarity of illustration, the wastewater vacuum inlet 38 has been drawn considerably elevated with respect to its optimal position). A bag filter 21 is provided at the inlet 15 of the recovery tank 16 for initial removal of gross particulate from the wash water. The bag filter is normally hidden from view, like the other internal parts of the opaque tanks 16, 23, 25, and 31. The recovery tank 16 further includes a suitable shut-off float valve 17 and is in fluid communication with a purge valve 14.

Once the wash water containing the contaminants is brought into the recovery tank, it is pumped by the sump pump 18 via transfer hose 19 into the inlet 20 of the batch reaction tank 23 of a manual or automatic clay-based flocculent powder wastewater treatment unit 43 (preferably a CETCO Model TT 125BF or larger) where the clay-based flocculent powders 46 are introduced and the combination mixed by a mixer motor 24. The wastewater treatment unit 43 thereby comprises one preferred wastewater treatment means for combining the clay-based flocculent powder with wastewater for removing industrial waste from the wastewater.

Clean water, ready for discharge or reuse, is produced in one easy step within minutes. The clean water is reclaimed via gravity flow out a clear water valve 27 and/or by pumping the floc out a sludge valve 28 and across a polyester cloth filter media 29.

The resulting Class 11 non-hazardous sludge 50 is collected on the filter cloth 29. Thereafter, the cloth can be drawn up over the sludge and tied, forming a portable disposal container. The reclaimed water that has fallen into the 50 gallon holding tank 31 is pumped by a sump pump 32 out an outlet 35 of the 50 gallon holding tank via a transfer hose 34 and into the inlet 26 of a nearby 300 gallon holding tank 25, where it is stored until it is reused or discharged to the sewer.

Preferably, the water so reclaimed is recycled in a closed-loop system by using the sump pump 33, or other pump means, to pump it out the recycle outlet 56 via a recycle hose 58 back to the cluster inlet 60 of the steam cleaning unit 10 for re-application to the work surface 48 being cleaned. As needed, additional water can be added to the system, to replace water lost due to evaporation and environmental absorption.

In some instances the water may require further "polishing." This is done by transferring the reclaimed water through a column filtration unit 39, preferably one utilizing granular absorption media such as CLARION brand granular absorption media available from CETCO. This will reduce the level of contaminants in the reclaimed water even further.

Appropriate valves (not illustrated) allow the sump pump 33 of the holding tank 25 of the wastewater treatment unit 43 to be switched selectively from the recycle hose 58 to the transfer hose 36. Alternatively, a separate booster pump may be installed to supply one or the other hose. Water is pumped, when desired, through the transfer hose 36 to the column filtration unit 39 by the sump pump. Enhanced polishing is accomplished by this passing of water through the column filtration unit 39, which utilizes such absorption media as CETCO's Model PM 100 CLARION brand pellets of clay and anthracite coal, another type of clay-based filtering media. A similar product is available from Wyo-Ben, Inc. Unlike the RM-10 blend of clay-based flocculent 46, PM-100 type media does not render the trapped contaminants non-hazardous. Fresh PM-100 itself is non-hazardous. Therefore, the waste classification of the spent material is determined by the constituents removed therewith.

This column filtration process removes approximately 95% of the remaining organic contaminants from the reclaimed water present after flocculation. After polishing, the water is returned to the holding tank 25 by means of a transfer hose 37.

OPERATION

Referring again to FIG. 1, the mobile apparatus 1 generally comprises a truck 40, trailer, or other wheeled portable container, mounted with a POWERMATIC brand steam cleaning unit, Legacy 2100 model, or similar steam cleaning unit 10 having a kerosene heating unit 41, at least one pressure sure washing gun 6, and, preferably, dual vacuum wands 8. This invention further comprises in combination therewith a CETCO TT 125BF or equivalent manual or automatic wastewater treatment unit 43 that cleans wastewater using a batch treatment method.

There are two possible sources with which to supply water to the steam cleaning unit: a municipal source having adequate pressure; or a holding tank aboard the truck, preferably having a booster pump (not illustrated) with which to push the water to the steam cleaning unit.

Cool water, however supplied, flows first to the engine oil cooler compartment 53 to cool the engine oil of the motor 11 of the steam cleaning unit 10. The water then is sent to the heater 41 where it is heated to temperatures of up to 300 degrees. The water next passes through a pressure pump 12 to the lower half of the pressure regulator 13. Heated water also circulates through the solution tank 44. The solution tank 44 allows for the introduction of various types of cleaners, degreasers, soaps or other type of cleaning agents. The water and, if desired, degreaser, are sent to the lower half of the pressure regulator.

The pressure regulator 13 next sends the heated water to a pressure gun 6 or dual-function vacuum wand 8 where it is applied to a work surface 48, such as the pavement of a parking lot, a vehicle motor, or a carpet in the interior of a building—outside of which the truck 40 is parked.

The hot water that was used for cleaning and which now contains the contaminants (and, optionally, degreaser) is retrieved from the work surface 48 via vacuum hoses 9 into the wastewater recovery tank 16 by means of the vacuum created by the upper half of the pressure regulator 13. Inside or adjacent the recovery tank is a purge or dump valve 14 which allows discharge to a sewer, when permissible. The recovery tank has an inlet port 15 with a bag filter 21 that filters any gross particulate matter, such as cigarette butts, gum, sticks, stones, and the like. The recovery tank 16 also has a float switch 17 which shuts off the system when full.

A sump pump 18 in the tank transfers the wastewater from the recovery tank 16 to the reaction tank 23 of the wastewater batch treatment (and recycling) unit 43. This pump is powered by the generator 22 located on or adjacent to the steam cleaning unit 10.

Once the wastewater is in the reaction tank 23, it is ready to be cleaned and recycled. A one horsepower, 110 volt mixer motor 24, located on the top of the reaction tank, is turned on to begin processing. The motor has a stainless steel shaft, coupler and propeller. The motor also receives its power from the generator 22.

Once the motor is running, a prescribed dosage of flocculent 46 from CETCO, Wyo-Ben, Inc., or any other producer of clay-based chemical flocculent is poured into the reaction tank 23. There is a sufficient amount of shear created by the mixer to allow for flocculation. When the proper dosage of clay-based flocculent 46 has been introduced, a process of encapsulation occurs. The contaminants are absorbed into the clay platelets. Within a few minutes, the chemical clay flocculent surrounds the oils, emulsions, suspended solids, and heavy metals, forming a large floc. The motor is turned off and the floc is allowed to settle for a few minutes whereupon it drops to the bottom or floats to the top of the reaction tank 23.

After the floc has formed, the smaller clear water valve 27, located on the under side of the reaction tank, is opened to allow for the clean water to pass downward though a polyester filter cloth 29, located above the clean water transfer or holding tank 31. The cloth is supported by a stainless steel band filter 30.

The cleaned water is transferred from the 50 gallon transfer tank 31 to the 300 gallon holding tank 25 on the back side of the wastewater treatment unit 43. The transfer of water to the 300 gallon holding tank is done via a sump pump 32 located in the 50 gallon holding tank. A two inch transfer hose 34 leads from a side port of the 50 gallon transfer tank to an inlet port 26 on the top of the 300 gallon holding tank. Switches and similar controls (not illustrated) for turning on the pumps and other electrical equipment are provided in convenient locations, as is known in the art.

When the clean water from the reaction tank 23 has finished passing through the filter cloth 29, a second larger sludge valve 28 is opened to allow the sludge to gravity flow downward and come to rest on top of the polyester filter cloth 29. Excess water leaches out downward from the sludge through the filter cloth 29 and into the transfer or holding tank 31.

When the sludge 50 is tested under current EPA guidelines, in most instances the sludge is acceptable for disposal in a Class 11 non-hazardous industrial landfill.

The reclaimed water is ready for transfer via the recycle hose 58 and reuse in the steam cleaning unit 10, or for safe discharge into a sewer drain. The sump pump 33 is located in the bottom of the 300 gallon holding tank 25 for these purposes. Power for this pump also comes from the generator 22. For direct transfer to a sewer drain, however, gravity flow may suffice.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, various modifications, alternative constructions, and equivalents may be employed without departing from the true spirit and scope of the invention. Such changes might involve alternative materials, components, structural arrangements, sizes, operational features or the like. Therefore, the above description and illustrations should not be construed as limiting the scope of the invention, which is defined by the appended claims.

The invention claimed is:

1. A mobile apparatus for dispensing and recovering water and removing industrial waste therefrom, including:
   a wheeled container;
   a clay-based flocculent powder wastewater treatment unit mounted in the wheeled container; and
   a steam cleaning unit in fluid communication with the clay-based flocculent powder wastewater treatment unit.

2. The apparatus of claim 1 further including:
   at least one pressure gun attached by a solution hose to the steam cleaning unit; and
   a vacuum wand attached by a vacuum hose to the steam cleaning unit.

3. The apparatus of claim 2, further including:
   a recovery tank of the steam cleaning unit in fluid communication with the vacuum hose;
   a reaction tank of the clay-based flocculent powder wastewater treatment unit;
   a first transfer hose connecting the recovery tank of the steam cleaning unit to the reaction tank of the clay-based flocculent powder wastewater treatment unit;
   a first holding tank of the clay-based flocculent powder wastewater treatment unit located below the reaction tank thereof;
   a second holding tank of the clay-based flocculent powder wastewater treatment; and
   a second transfer hose connecting the first holding tank to the second holding tank.

4. The apparatus of claim 3 further including:
   a recycle hose connecting the second holding tank to the steam cleaning unit, the recycle hose thereby in fluid communication with the solution hose,
   whereby a closed loop is formed between the vacuum hose and the solution hose.

5. The apparatus of claim 4 further including:
   a column filtration unit in fluid communication with the second holding tank.

6. The apparatus of claim 5 wherein:
   the wheeled container is the box of a truck.

7. The apparatus of claim 5 wherein:
   there is more than one vacuum wand.

8. The apparatus of claim 5 further including:
   a fiberglass tray onto which a work piece may be placed with which to catch and collect water sprayed onto the work piece by the at least one pressure gun for recovery by the vacuum wand.

9. A mobile apparatus for dispensing water, and recovering wastewater and removing industrial waste therefrom, including:

a wheeled container;

clay-based flocculent powder;

wastewater treatment means mounted in the wheeled container for combining the clay-based flocculent powder with wastewater for removing industrial waste from the wastewater;

and a steam cleaning unit in fluid communication with the wastewater treatment means.

10. The apparatus of claim 9 further including:

means in fluid communication with the steam cleaning unit for dispensing water and for recovering wastewater.

11. The apparatus of claim 10 wherein:

the dispensing and recovering means includes
a pressure gun attached by a solution hose to the steam cleaning unit; and
a vacuum wand attached by a vacuum hose to the steam cleaning unit.

12. The apparatus of claim 11 further including:

a recovery tank of the steam cleaning unit in fluid communication with the vacuum hose;

a reaction tank of the clay-based flocculent powder wastewater treatment means;

a first transfer hose connecting the recovery tank of the steam cleaning unit to the reaction tank of the clay-based flocculent powder wastewater treatment means;

a first holding tank of the clay-based flocculent powder wastewater treatment means located below the reaction tank thereof, a second holding tank of the clay-based flocculent powder wastewater treatment means having a fluid capacity greater than the fluid capacity of the first holding tank; and a second transfer hose connecting the first holding tank to the second holding tank.

13. The apparatus of claim 12 further including:

a recycle hose connecting the second holding tank to the steam cleaning unit, the recycle hose thereby in fluid communication with the solution hose,
whereby a closed loop is formed between the vacuum hose and the solution hose.

14. The apparatus of claim 13 further including:

a column filtration unit in fluid communication with the second holding tank.

15. A mobile apparatus for dispensing and recovering water and removing industrial waste therefrom, including:

a wheeled container attached to a truck;

a plurality of hose reels on the container;

a clay-based flocculent powder wastewater treatment unit mounted in the wheeled container;

a steam cleaning unit in fluid communication with the clay-based flocculent powder wastewater treatment unit;

a pressure gun attached by a solution hose to the steam cleaning unit;

a vacuum wand attached by a vacuum hose to the steam cleaning unit;

a recovery tank of the steam cleaning unit in fluid communication with the vacuum hose;

an in-line bag filter between the vacuum hose and the recovery tank;

a reaction tank of the clay-based flocculent powder wastewater treatment unit;

a first transfer hose connecting the recovery tank of the steam cleaning unit to the reaction tank of the clay-based flocculent powder wastewater treatment unit;

a first holding tank of the clay-based flocculent powder wastewater treatment unit located below the reaction tank thereof;

a second holding tank of the clay-based flocculent powder wastewater treatment unit having a fluid capacity greater than the fluid capacity of the first holding tank; and a second transfer hose connecting the first holding tank to the second holding tank.

16. The apparatus of claim 15 further including:

a column filtration unit in fluid communication with the second holding tank.

17. The apparatus of claim 16 further including:

a recycle hose connecting the second holding tank to the steam cleaning unit, the recycle hose thereby in fluid communication with the solution hose,
whereby a closed loop is formed between the vacuum hose and the solution hose.

18. The apparatus of claim 15 wherein:

there is more than one vacuum wand.

19. The apparatus of claim 15 further including:

a fiberglass tray onto which a work piece may be placed with which to catch and collect water sprayed onto the work piece by the pressure gun for recovery by the vacuum wand.

* * * * *